US010782868B2

(12) United States Patent
Mate et al.

(10) Patent No.: US 10,782,868 B2
(45) Date of Patent: Sep. 22, 2020

(54) IMAGE NAVIGATION (71) Applicant: NOKIA TECHNOLOGIES OY, Espoo (FI)

(72) Inventors: Sujeet Shyamsundar Mate, Tampere (FI); Jussi Leppänen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 48 days.

(21) Appl. No.: 15/538,280

(22) PCT Filed: Dec. 18, 2015

(86) PCT No.: PCT/FI2015/050900
§ 371 (c)(1),
(2) Date: Jun. 21, 2017

(87) PCT Pub. No.: WO2016/107970
PCT Pub. Date: Jul. 7, 2016

(65) Prior Publication Data
US 2018/0046342 A1 Feb. 15, 2018

(30) Foreign Application Priority Data

Dec. 31, 2014 (EP) .................................... 14200733

(51) Int. Cl.
*G06F 3/0485* (2013.01)
*G06F 3/0484* (2013.01)
(Continued)

(52) U.S. Cl.
CPC ........ *G06F 3/0485* (2013.01); *G06F 3/04845* (2013.01); *G06F 16/5854* (2019.01); *G06T 3/40* (2013.01); *H04N 1/00458* (2013.01)

(58) Field of Classification Search
CPC ...................................................... G06F 3/0485
(Continued)

(56) References Cited

U.S. PATENT DOCUMENTS 7,770,128 B2 * 8/2010 McCall ................... G06T 11/60
715/784
9,892,761 B2 * 2/2018 Carter .................. G11B 27/105
(Continued)

FOREIGN PATENT DOCUMENTS

CN 1691740 A 11/2005
CN 101794203 A 8/2010
(Continued)

OTHER PUBLICATIONS

Jan. 3, 2018 Office Action issued in European Patent Application No. 14200733.5.
(Continued)

*Primary Examiner* — William D Titcomb
(74) *Attorney, Agent, or Firm* — Squire Patton Boggs (US) LLP (57) ABSTRACT

A method comprising: enabling display at a first target location in a display image of a first portion of an image; and enabling, in response to a defined user action, non-linear image-content-dependent navigation to a second portion of the image to change the display image to include at a second target location in the display image the second portion of the image, wherein the second portion of the image is dependent upon a content of the image.

18 Claims, 9 Drawing Sheets

(51) Int. Cl.
*G06F 16/583* (2019.01)
*G06T 3/40* (2006.01)
*H04N 1/00* (2006.01)

(58) Field of Classification Search
USPC .......................................................... 715/784
See application file for complete search history.

(56) References Cited

U.S. PATENT DOCUMENTS

| | | | | |
|---|---|---|---|---|
| 10,289,657 B2* | 5/2019 | Audet | .................. | G06F 3/04817 |
| 2005/0251015 A1* | 11/2005 | Takikawa | .................. | G06T 3/40 |
| | | | | 600/407 |
| 2009/0251553 A1* | 10/2009 | Cambell | ............... | G06F 3/0485 |
| | | | | 348/211.99 |
| 2010/0173678 A1* | 7/2010 | Kim | .................. | H04N 5/23216 |
| | | | | 455/566 |
| 2011/0007074 A1* | 1/2011 | Sakashita | ............. | G01C 21/367 |
| | | | | 345/428 |
| 2012/0036473 A1* | 2/2012 | Haseyama | .............. | G06F 3/016 |
| | | | | 715/784 |
| 2012/0331417 A1* | 12/2012 | Lee | ....................... | G06F 3/0488 |
| | | | | 715/784 |
| 2013/0016128 A1* | 1/2013 | Bhatt | ........................ | G06T 3/40 |
| | | | | 345/661 |
| 2013/0067392 A1* | 3/2013 | Leonard | ................ | G06F 3/0488 |
| | | | | 715/784 |
| 2014/0298250 A1* | 10/2014 | Zaman | .................. | G06F 3/0485 |
| | | | | 715/784 |
| 2015/0113474 A1* | 4/2015 | Gallup | ................ | G06F 3/04845 |
| | | | | 715/784 |
| 2015/0286360 A1* | 10/2015 | Wachter | .................... | G06F 3/14 |
| | | | | 345/173 |

FOREIGN PATENT DOCUMENTS

| | | |
|---|---|---|
| CN | 101795350 A | 8/2010 |
| CN | 103141079 A | 6/2013 |
| CN | 103458180 A | 12/2013 |
| EP | 1 589 478 A2 | 10/2005 |
| EP | 2 207 342 A2 | 7/2010 |
| WO | WO 2013/010103 A1 | 1/2013 |

OTHER PUBLICATIONS

International Search Report & Written Opinion dated Jun. 9, 2016 corresponding to International Patent Application No. PCT/FI2015/050900.
Oct. 9, 2018 Office Action issued in European Patent Application No. 14200733.5.
Chinese Office Action corresponding to CN Application No. 201580071604.8, dated Oct. 8, 2019.
European Office Action issued in corresponding European Patent Application No. 14/200 733.5-1216 dated May 7, 2019.
Chinese Office Action corresponding to CN Application No. 201580071604.8, dated Jul. 2, 2020.

* cited by examiner

IMAGE NAVIGATION

TECHNOLOGICAL FIELD

Embodiments of the present invention relate to navigation. In particular, they relate to methods, apparatus and computer programs configured to enable navigation by a user within an image.

BACKGROUND

Some images have a large size compared to the window (display image) used to display them. For example a panorama image has an extremely wide field of view resulting in a large width to height aspect ratio.

It may be possible to rescale an image so that its longest dimension matches a corresponding dimension of the display image, however its shortest dimension may then be significantly smaller that the corresponding dimension of the display image. This significantly reduces resolution.

It may be desirable for a user to locate within an image particular content such as for example objects of interest. It would be desirable to improve the manner in which a user may navigate to such content.

BRIEF SUMMARY

According to various, but not necessarily all, embodiments of the invention there is provided a method comprising: enabling display at a first target location in a display image of a first portion of an image; and enabling, in response to a defined user action, non-linear image-content-dependent navigation to a second portion of the image to change the display image to include at a second target location in the display image the second portion of the image, wherein the second portion of the image is dependent upon a content of the image.

According to various, but not necessarily all, embodiments of the invention there is provided an apparatus comprising: at least one processor; and
at least one memory including computer program code, the at least one memory and the computer program code configured to, with the at least one processor, cause the apparatus at least to perform the method.

The method may comprise:
enabling display of only the first portion of the image in the display image or only the second portion of the image in the display image or enabling display of both the first portion and the second portion of the image in the display image and/or
enabling image processing of the image to identify at least the second portion of the image and/or
enabling a change in location of the second portion over time and/or
image processing of the content of the image to change the second target location compared to the first target location and/or
enabling image processing of the content of the image to change a resolution of the display image based on the content of the image and/or
enabling image processing of the image to define target areas of the image and non-target areas of the image, wherein the non-linear image-content-dependent navigation enables navigation to locate a target area at a target location of the display image but does not enable navigation to locate a non-target area at a target location of the display image wherein navigation to obtain a display image comprising only non-target areas is forbidden; and/or
enabling the user selection of defined user input options provided on a display at a periphery of the display, wherein the display image is positioned centrally in the display and/or further comprising enabling user browsing to the second portion by using a pinch to squeeze non-target areas and/or further comprising enabling user browsing to the second portion by using a pinch to squeeze non-target areas while protected areas of the image are protected and are not squeezed by the pinch and/or wherein the navigation comprises browsing to a target area in response to a user swipe motion on a touch sensitive display.

The first target location may be the same as the second target location. The second portion of the image may be automatically identified based on the content of the image. The display image may be defined with respect to a fixed location of a notional observer observing a scene captured in the image, wherein different portions of the image correspond to different orientations of the notional observer. The defined user action may result in an outcome dependent upon the content of the image and independent of kinematics of the user action including speed and acceleration.

The non-linear image-content-dependent navigation may comprise a lateral component in a direction of a lateral pan of the image and a transverse component in a direction orthogonal to a direction of a lateral pan of the image. The non-linear image-content-dependent navigation may be dependent upon a location of the second portion of the image relative to a location of the first portion of the image.

According to various, but not necessarily all, embodiments of the invention there is provided a method comprising: enabling display at a first target location in a display image of a first portion of an image; and enabling, in response to a defined user action, image-content-dependent navigation to a second portion of the image to change the display image to include at a second target location in the display image the second portion of the image, wherein the second portion of the image is dependent upon a content of the image.

According to various, but not necessarily all, embodiments of the invention there is provided an apparatus comprising: at least one processor; and
at least one memory including computer program code, the at least one memory and the computer program code configured to, with the at least one processor, cause the apparatus at least to perform the method.

The method may comprise:
enabling display of only the first portion of the image in the display image or only the second portion of the image in the display image or enabling display of both the first portion and the second portion of the image in the display image and/or
enabling image processing of the image to identify at least the second portion of the image and/or
enabling a change in location of the second portion over time and/or
image processing of the content of the image to change the second target location compared to the first target location and/or
enabling image processing of the content of the image to change a resolution of the display image based on the content of the image and/or
enabling image processing of the image to define target areas of the image and non-target areas of the image, wherein the non-linear image-content-dependent navigation enables navigation to locate a target area at a target location of the display image but does not enable navigation to locate a non-target area at a target location of the display image wherein navigation to obtain a display image comprising only non-target areas is forbidden; and/or enabling the user selection of defined user input options provided on a display at a periphery of the display, wherein the display image is positioned centrally in the display and/or further comprising enabling user browsing to the second portion by using a pinch to squeeze non-target areas and/or further comprising enabling user browsing to the second portion by using a pinch to squeeze non-target areas while protected areas of the image are protected and are not squeezed by the pinch and/or wherein the navigation comprises browsing to a target area in response to a user swipe motion on a touch sensitive display.

The first target location may be the same as the second target location. The second portion of the image may be automatically identified based on the content of the image. The display image may be defined with respect to a fixed location of a notional observer observing a scene captured in the image, wherein different portions of the image correspond to different orientations of the notional observer. The defined user action may result in an outcome dependent upon the content of the image and independent of kinematics of the user action including speed and acceleration.

The image-content-dependent navigation may comprise a lateral component in a direction of a lateral pan of the image and a transverse component in a direction orthogonal to a direction of a lateral pan of the image. The image-content-dependent navigation may be dependent upon a location of the second portion of the image relative to a location of the first portion of the image.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which.

DETAILED DESCRIPTION

The examples described below enable a user to navigate an image that at the scale at which it is viewed is significantly larger than the display size used to display a portion of the image in a convenient and intuitive way. The navigation is non-linear and dependent upon the image content of the image. The navigation does not occur in a linear way by for example scrolling an image pixel by pixel through a display image, instead, a user more quickly navigates to portions of the image that are of most interest and that have positions within the image dependent upon the image content.

In some examples, the image is a wide field of view image. A wide field of view image has a width at least three times greater than its height. An example of a wide field of view image is a panorama image 20.

A panorama image 20 may be created by stitching together images captured from different, offset fields of view. These images may be taken by one or more cameras. If a single camera is used then images may be taken as a sequence and if multiple cameras are used images may be taken simultaneously or in a sequence.

An image 20 may be a still image or it may be a video image. A still image is fixed and does not change in time, whereas a video image does change in time (a motion picture).

Figure 7A:
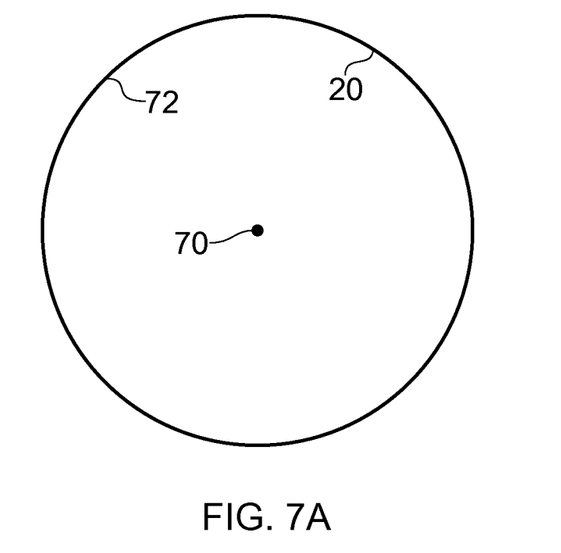
FIGS. 7A and 7B illustrate examples of recording of an image.
Figure 7B:
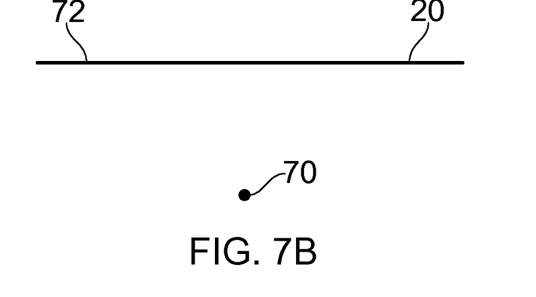

Referring to FIGS. 7A and 7B, an image 20 may be formed in a number of different ways. An image 20 may be a still image or it may be a video image. A still image is fixed and does not change in time, whereas a video image does change in time.

In both FIGS. 7A and 7B, a panorama image is formed by combining images captured from a fixed location 70. Each of the different images is taken at a different orientation. In FIG. 7A, the panorama image 20 is a 360 degree image, whereas in FIG. 7B the panorama image 20 is a wide field of view image.

In some examples, a single camera may be located at the fixed location 70. Different images may then be captured at different orientations of the camera and the different images stitched together to form the image 20. In this example, the sequence of images that are stitched together to form the image 20 will necessarily have been captured at different times although preferably with a relative offset in time of a few seconds or minutes.

Alternatively, it may be possible to capture multiple images from multiple cameras where each camera captures an image from a single point of view or captures images from multiple points of view. In this example, it may be possible for the images to be captured simultaneously from the perspective of different orientations (points of view) from the fixed location.

The capturing of an image 20 comprises the recording of image data representing a scene 72 from one or more image sensors. The recording of image data may comprise only temporary recording, or it may comprise permanent recording or it may comprise both temporary recording and permanent recording. Temporary recording implies the recording of data temporarily. This may, for example, occur during sensing, occur at a dynamic memory, occur at a buffer such as a circular buffer, a register, a cache or similar.

Permanent recording implies that the data is in the form of an addressable data structure that is retrievable from an addressable memory space and can therefore be stored and retrieved until deleted or over-written, although long-term storage may or may not occur.

It will therefore be appreciated that in the following description an image 20 such as a panorama image may be formed in a number of different ways. The display image 10 may thus be defined in relation to a fixed location 70 of a notional observer observing, at a particular scale, a scene 72 captured in the image 20, where different portions of the image 20 correspond to different orientations of the notional observer. The scale may be such that the whole of the captured scene 72 is not simultaneously viewable in the display image 10 but that only a portion, not the whole, of the image 20 may be viewed in the display image 10 at that scale.

According to the various embodiments of the invention described, there is provided a method 2 comprising: enabling display, at a target location 12 in a display image 10, of a first portion 21 of an image 20; and enabling, in response to a defined user action 30, non-linear image-content-dependent navigation 40 to a second portion 22 of the image 20 to change the display image 10 to include at a second target location 12' in the display image 10 the second portion 22 of the image 20, wherein the second portion 22 of the image 20 is dependent upon a content of the image 20.

In some but not necessarily all examples, the non-linear image-content-dependent navigation 40 is a scale-invariant navigation. The first portion 21 of the image 20 before the defined user action 30, and the second portion 22 of the image 20 after the defined user action 30 are at the same scale (same resolution).

In some but not necessarily all examples, the non-linear image-content-dependent navigation 40 may be a scale-variant navigation. The first portion 21 of the image 20 before the defined user action 30, and the second portion 22 of the image 20 after the defined user action 30 may be at different scales (different resolutions).

Figures 1A, 1B:
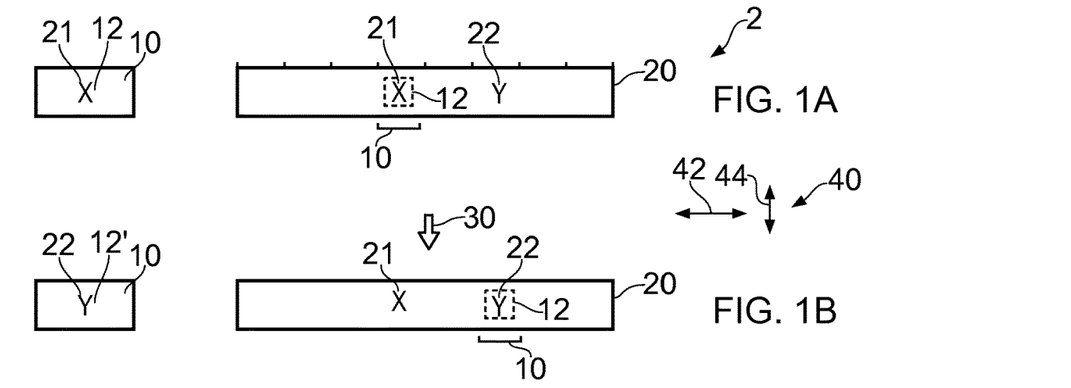
FIGS. 1A, 1B, 2A, 2B, 3A, 3B illustrate examples of a display image and its location within the image before a defined user action and after the defined user action.
Figure 2A:
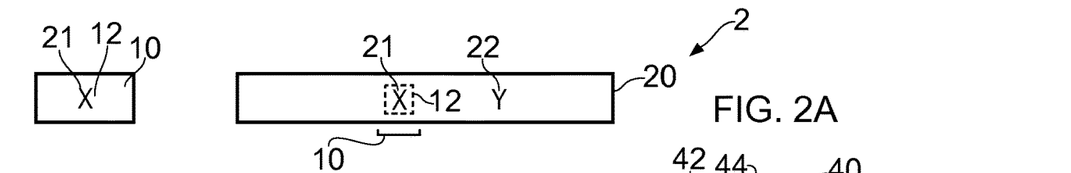
Figure 2B:
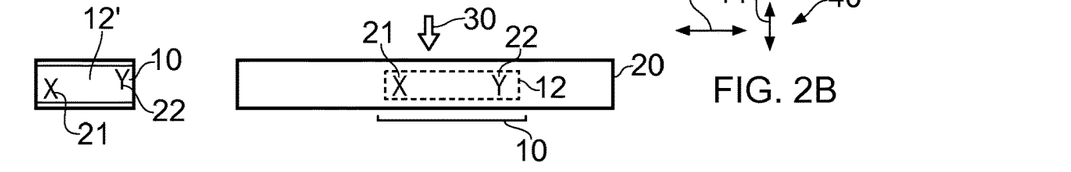
Figures 3A, 3B:
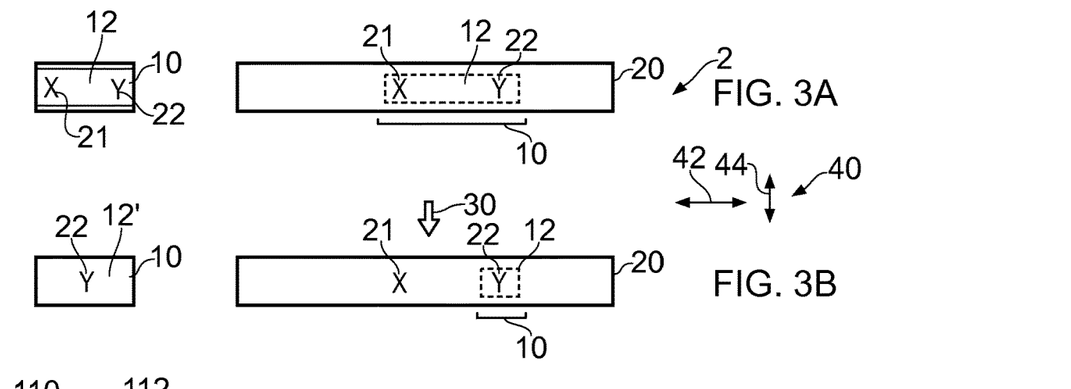

FIGS. 1A, 2A, 3A illustrate an example of a display image 10 (left hand side) and its location within an image 20 (right hand side) before a defined user action 30. FIGS. 1B, 2B, 3B illustrates the example of the display image 10 (left hand side) and the position of the display image 10 within the image 20 (right hand side) after the defined user action 30.

In this particular example, the image 20 is a panorama image 20. However, as described above different types of images 20 may be used.

As illustrated in FIGS. 1A, 2A, 3A, to the left hand side, the display image 10 is the image displayed on a display. A first portion 21 of an image 20 comprises first content X and is located at a first target location 12 in the display image 10.

The location of the display image 10 within the image 20 is illustrated to the right hand side. The image 20 comprises a first portion 21 comprising first content X and a second portion 22 comprising second content Y. The first content X and the second content Y may be content of a similar or different type, for example, they may relate to different objects of interest or the same or similar objects of interest.

As illustrated in FIGS. 1B, 2B, 3B In FIG. 1B, to the right hand side, the position of the display image 10 has moved after the user action 30 so that it includes the second portion 22 of the image 20 at a second target location 12' in the display image 10. As illustrated to the left, the second portion 22 of the image 20 comprising second content Y is located at the second target location 12' in the display image 10.

In the examples illustrated in FIGS. 1B, 2B, 3B, although the position of the display image 10 has moved after the user action 30 its size/scale has not changed so that it the first portion 21 and the second portion 22 of the image 20 are at the same scale. The navigation that occurs as a result of the user action 30 is scale invariant.

In FIG. 1A, only the first content X of the image 20 is displayed at the first target location 12 of the display image 10. The second content Y at the second portion 22 of the image is not included in the display image 10.

After the defined user action 30, as illustrated in FIG. 1B, only the second content Y of the image 20 is included in the display image 10. The first content X located at the first portion 21 of the display image 20 is not included in the display image 10 after the defined user action 30.

Although it is possible for the first target location 12 and the second target location 12' to be different, in this example the first target location 12 and the second target location 12' are the same. They have the same size (scale) and they have the same position. In FIG. 1A the first content X found at the first portion 21 of the image is centrally located in the display image 10 and in FIG. 1B, the second content Y at the second portion 22 of the image 20 is also centrally located after the defined user action 30.

In FIG. 2A, only the first content X of the image 20 is displayed at the first target location 12 of the display image 10. The second content Y at the second portion 22 of the image 20 is not included in the display image 10.

After the defined user action 30, as illustrated in FIG. 2B, both the first content X at the first portion 21 of the image 20 and the second content Y at the second portion 22 of the image 20 are included in the display image 10. The first content X located at the first portion 21 of the display image 20 is included in the display image 10 after the defined user action 30.

Although it is possible for the first target location 12 and the second target location 12' to be the same, in this example the first target location 12 and the second target location 12' are different. Although they have the same size (scale), they have different positions. In FIG. 2A the first content X found at the first portion 21 of the image is centrally located in the display image 10 at the first target location 12. In FIG. 2B, the second target region 12' for the second content Y at the second portion 22 of the image 20 is located off-center after the defined user action 30. Also, in FIG. 2B the first content X found at the first portion 21 of the image 20 is located off-center of the display image 10 at the first target location 12. Both the first and second target regions 12, 12' exist simultaneously in the display image 10.

In FIG. 3A, both the first content X at the first portion 21 of the image 20 and the second content Y at the second portion 22 of the image 20 are displayed at the first target location 12 of the display image 10.

After the defined user action 30, as illustrated in FIG. 3B, the first content X at the first portion 21 of the image 20 is no longer included in the display image 10 and the second content Y at the second portion 22 of the image 20 is included in the display image 10.

Although it is possible for the first target location 12 and the second target location 12' to be the same, in this example the first target location 12 and the second target location 12' are different. Although they have the same size (scale), they have different positions. In FIG. 3A the first content X found at the first portion 21 of the image is located left of center in the display image 10 at the first target location 12. In FIG. 3B, the second target region 12' for the second content Y at the second portion 22 of the image 20 is located centrally after the defined user action 30.

In the examples described, image processing of the image 20 may occur to identify the second portion 22 of the image 20. In the example illustrated, the second portion 22 of the image 20 may be identified because the second content Y at the second portion 22 has particular characteristics that are identified by image processing.

For example, it may be possible to process the image 20 to identify objects of interest in the image 20. This may be achieved by using image recognition techniques so that a portion of the image 20 that corresponds to a reference object can be identified. It may also be able to process the image 20 using depth information, which may be achieved by depth sensors or by using parallax/stereoscopic imaging to identify foreground objects or other objects of interest. In addition, it may be possible to use other additional data to identify the second portion 22 of the image 20. Examples of such additional data may be for example historic information concerning what selections or actions a user has previously made, it may involve a search of a user's contacts to identify within the image content that is similar to the faces of the user's contacts. The contacts may be contacts that are stored locally on the apparatus that displays the image 20 or they may, for example, be contacts that are stored in the cloud or at a remote server for example as part of a social media platform. In addition, contextual information may be taken into account such as for example actions recently performed by a user, items purchased by the user, internet searches performed by the user so that objects of interest within the image 20 may be identified taking into account this additional information.

The identification of the second portion 22 of the image 20 using image processing may occur automatically or, alternatively, it may occur as a result of the user performing a user input action.

Figure 8:
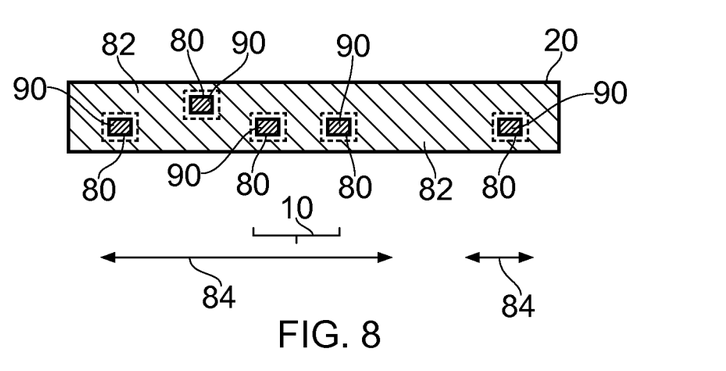
FIG. 8 illustrates an example of an image comprising a plurality of objects of interest.

FIG. 8 illustrates an example of an image 20 comprising a plurality of objects of interest 90.

The second portion 22 of the image 20 may relate to a single object of interest 90 identified by image processing, or alternatively it may relate to a collection of objects of interest identified by image processing. A collection of objects may be created for simultaneous viewing, and treated as a single object of interest 90. The collection of objects may be created as a result of identifying a relationship between the objects. They may for example all be contacts of the user or have some other relationship that links the objects It will be appreciated that where the image 20 is a video image, it may also be possible to identify objects of interest 90 by identifying which parts of the image 20 are moving and which are stationary. Where an object of interest 90 is moving within an image 20 over time, it is possible to track the motion of the object of interest 90 as its location changes relative to the background of the image 20. In this circumstance, the second portion 22 of the image 20 may change its location within the image 20 over time.

In some examples, it may be desirable that the target location 12 is at a fixed position and size such that the first target location 12 and the second target location 12' are the same, that is they have the same size and position within the display image 10. In other examples, it may be desirable to change the size/position/scale of the target location 12 in the display image 10. The determination of the target location position/size/scale may be dependent upon image processing of the content of the image 20 and, in particular, the image processing of the second portion 22 of the image 20.

For example, if the second portion 22 of the image 20 comprises a single object of interest 90 then it may be desirable to place the single object of interest 90 in a central location of the display image 10. In this example the target location 12' may be of a size corresponding to the object of interest and located at a centre position within the display image 10. In other examples, it may be desirable to take into account the content of the image 20 surrounding the object of interest 90. For example it may be desirable to locate the object of interest 90 according to a predefined photographic rule or compositional rule such as the 'rule of one thirds'. It may therefore be desirable to constrain the location of the object of interest 90 so that it lies in a predefined position within the display image 10.

In other examples, the display image 10 may comprise more than one object of interest 90. In such circumstances, the second target region 12' may be redefined, compared to the first target region 12, so that it includes all of the objects of interest 90.

In some examples, it may be desirable to maintain a fixed scale (resolution) for the display image 10. In other examples, in may be desirable to change the resolution of the display image 10 while for example changing zoom or aspect ratio. In particular this may be desirable where the display image 10 needs to accommodate a number of objects of interest 90

FIG. 8 illustrates an example of an image 20 comprising a plurality of objects of interest 90. A plurality of target areas 80 are defined in relation to the objects of interest 90. Each object of interest 90 lies within a target area 80. The areas of the image 20 that are not target areas 80 are non-target areas 82. In this example, but not necessarily all examples, the non-linear image-content-dependent navigation 40 allows a user to navigate to the target areas 80 but does not allow a user to navigate to the non-target areas 82. The location 84 of the display image 10 within the image 20 may be such that any of the target areas 80 can be located at a target location of the display image 10 by navigation 40 and the non-target areas 82 cannot be located at a target location 12, 12' of the display image 10 by navigation. As illustrated by the discontinuity in the possible location 84 of the display image 10, it is not possible to display in the display image 10, by navigation, only non-target regions 82. The effort required by a user to reach a desired portion of the image 20, for example a second portion 22, is not necessarily directly proportional to the ratio between the size of the image 20 and the size of the display image 10.

Referring to FIGS. 7A and 7B, it has already been described how the display image 10 is defined in relation to a fixed location 70 of a notional observer observing a scene 72 captured in the image 20, wherein different portions of the image 20 correspond to different orientations of the notional observer.

As illustrated in the FIGS. 1A-3B, the navigation 40 may comprise a lateral component 42 in a direction of a pan of the image 20 and a transverse component 44 in a direction orthogonal to a direction of a pan of the image 20. The lateral component 42 and the transverse component 44 (if any) change the display image 10 to include, at a second target location 12' in the display image 10, the second portion 22 of the image 20. The size of the lateral component 42 of navigation 40 and the size of the transverse component 44 of navigation 40 (if any) will depend upon the relative locations of the first content X in the first portion 21 of the image 20 and the second content Y at the second portion 22 of the image 20 and, if appropriate, any change in resolution of the display image 10 and any change in the target location 12, 12' within the display image 10.

It will therefore be appreciated that the non-linear image-content-dependent navigation operates on different parts of the image 20 differently dependent upon the content of the image 20.

Thus the defined user action 30 results in an outcome dependent upon the content of the image 20. That is, the navigation 40 is content dependent. The navigation may also be independent of the kinematics of the user action such as speed or acceleration. In this way, the navigation is non-linear.

FIGS. 9A to 9G illustrate an example of non-linear image-content-dependent navigation in response to a defined user action 30. In this example, the defined user action 30 is selection of a defined user input option 206.

Figure 9A:
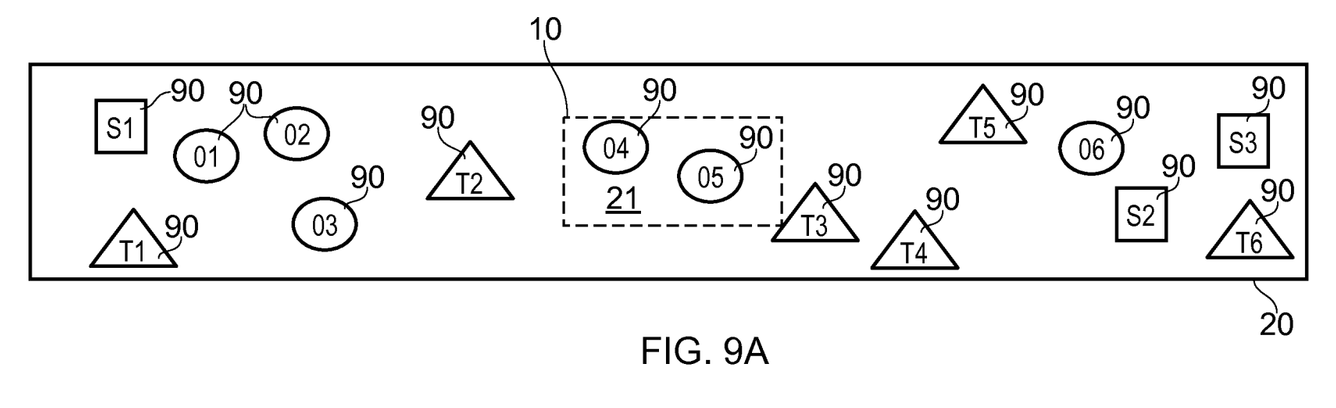
FIGS. 9A to 9G illustrate an example of image-content-dependent navigation in response to a defined user action.
Figure 9B:
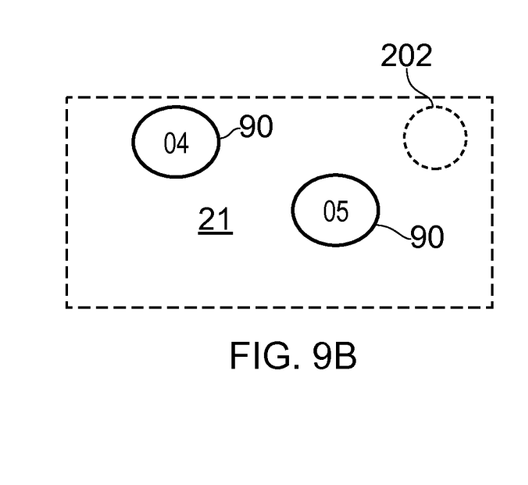

FIG. 9A illustrates an image 20 comprising a plurality of objects of interest 90 identified using image processing. In the example of FIG. 9A, the display image 10 comprises the objects of interest "O4" and "O5". FIG. 9B illustrates the first portion 21 of the image 20 and FIG. 9A illustrates the location of that first portion 21 within the image 20.

Figure 9C:
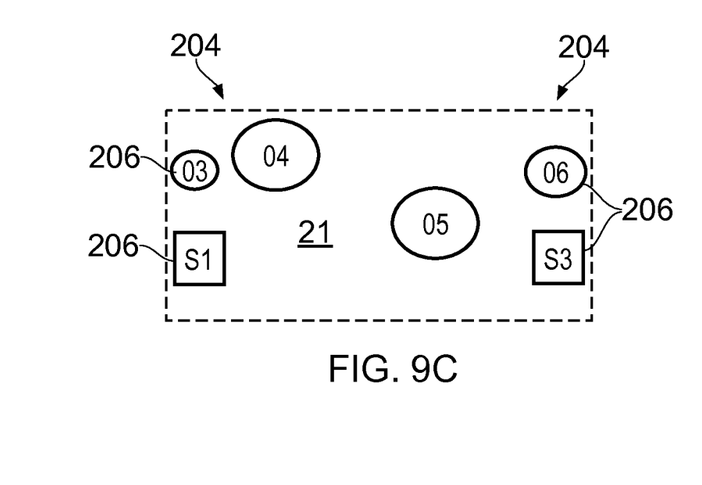

A user touches the display or otherwise provides a user input 202, which enables defined user input options 206. As illustrated in FIG. 9C, the user input options 206 are displayed on the display 114 at a periphery of the display image 10. In this example a first peripheral portion 204 to the left identifies multiple user selectable input options 206 such as, for example, those relating to some or all of the objects of interest "O3" and "S1" to the left of the first portion 21 in the image 20 of FIG. 9A. In this example a second peripheral portion 204 to the right identifies multiple user selectable input options 206 such as, for example, those relating to some or all of the objects of interest "O6" and "S3" to the right of the first portion 21 in the image 20 of FIG. 9A. User selection of a user selectable input option 206, is a defined user action 30, and results in non-linear image-content-dependent navigation 40.

Figure 9D:
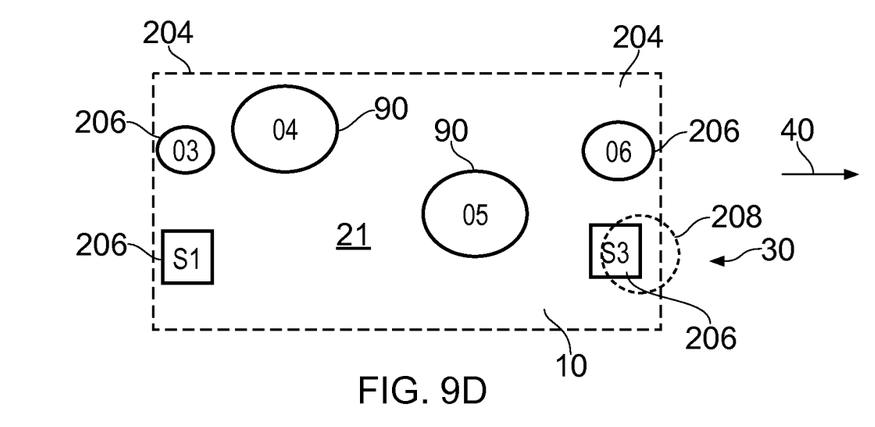
Figure 9E:
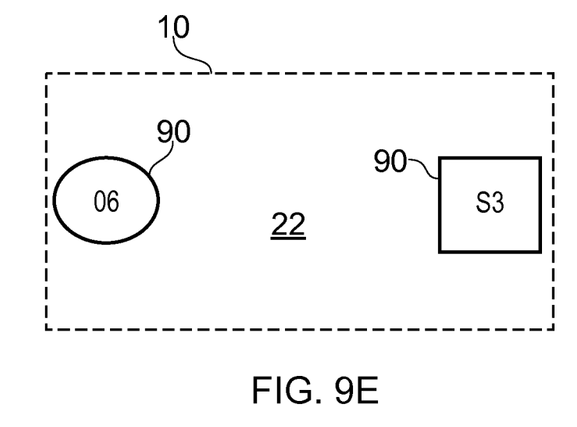

FIG. 9D illustrates the selection 208 of the user input option 206 that relates to the object of interest "S3" and FIG. 9E illustrates the consequence of that selection. In FIG. 9D, a first portion 21 of the image 20 is displayed in the display image 10. In FIG. 9E, the display image 10 has been changed to include in the display image 10 a second portion 22 of the image 20. This second portion 22 of the image 20 is dependent upon the content of the image 20, comprising the region of interest "S3". The navigation 40 between the display image 10 illustrated in FIG. 9D and the display image 10 illustrated in FIG. 9E is a non-linear image-content-dependent navigation. The content of the display image 10 jumps to the selected object of interest "S3" without pausing on portions of the image 20 between the first portion 21 and the second portion 22.

Figure 9F:
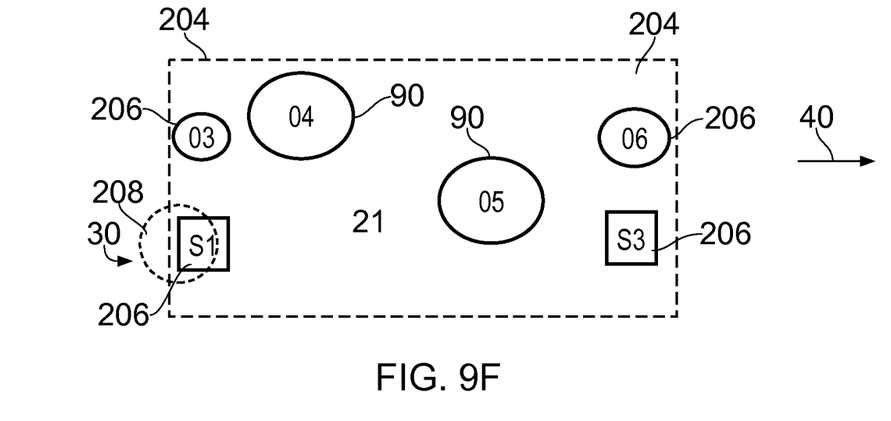
Figure 9G:
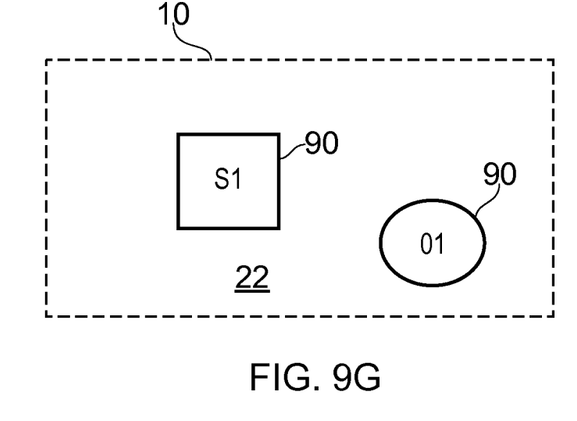

FIG. 9F illustrates the selection 208 of the user input option 206 that relates to the object of interest "S1" and FIG. 9G illustrates the consequence of that selection. In FIG. 9F, a first portion 21 of the image 20 is displayed in the display image 10. In FIG. 9G, the display image 10 has been changed to include in the display image 10 a second portion 22 of the image 20. This second portion 22 of the image 20 is dependent upon the content of the image 20 comprising the region of interest "S1". The navigation 40 between the display image 10 illustrated in FIG. 9F and the display image 10 illustrated in FIG. 9G is a non-linear image-content-dependent navigation. The content of the display image 10 jumps to the selected object of interest "S1" without pausing on portions of the image 20 between the first portion 21 and the second portion 22.

FIGS. 10A to 10E illustrate another, different, example of non-linear image-content-dependent navigation 40 in response to a defined user action 30. In this example, the defined user action 30 is a pinch gesture 300.

A location of the display image 10 within the image 20 is illustrated using dashed lines. The content displayed within the display image 10 changes with each defined user action as illustrated in FIGS. 10B-10E.

Figure 10A:
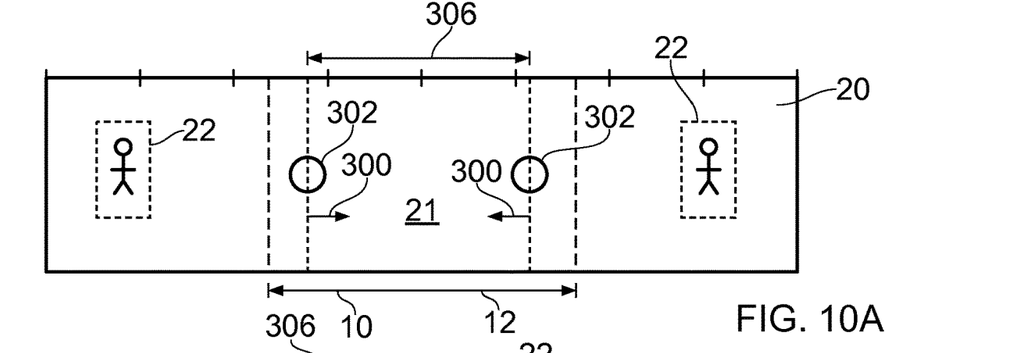
FIGS. 10A to 10E illustrate an example of image-content-dependent navigation in response to a defined user action.

The image 20 in this example comprises two second portions 22 that are separated by the first portion 21 of the image 20.

In FIG. 10A, a first portion 21 of the image 20 is displayed at a first target location 12 in the display image 10.

Figure 10B:
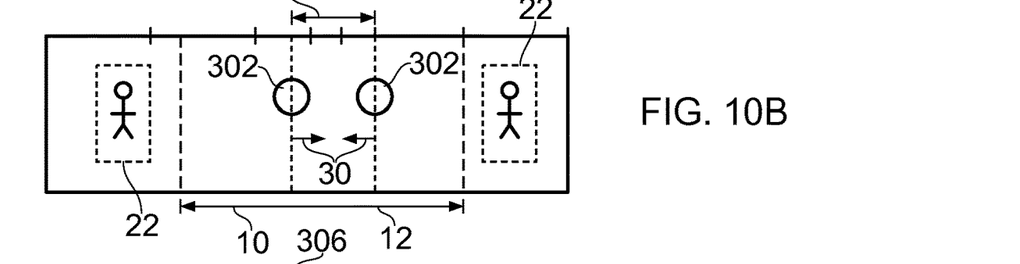
Figure 10C:
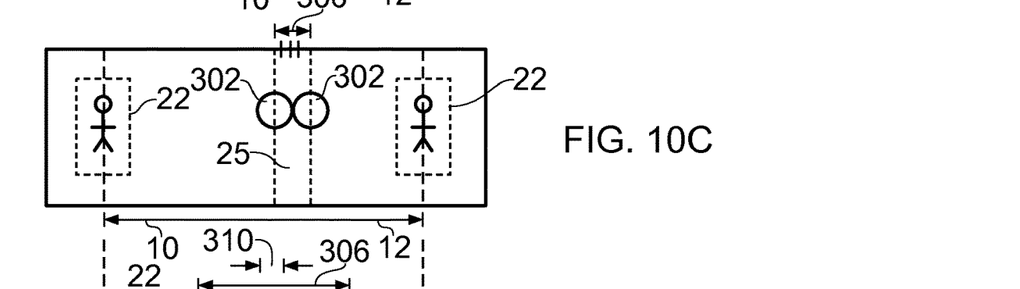

A user makes a dual touch input on the display image 10 by simultaneously making touches at image locations 302 that are separated by a distance 306 and then performing a pinch maneuver 300 that draws the touch image locations 302 towards each other as illustrated in FIGS. 10B and 100.

It will be appreciated that as the pinch gesture is executed, the size of the display image 10 does not change whereas the separation distance 306 between the dual touch image locations 302 decreases. In this example, the content of the image 20 corresponding to the distance 306 is condensed laterally. In the example illustrated there is no condensation of the image 20 in the transverse direction, although in other examples this may be possible. Thus in the illustrated example, the aspect ratio of the image 20 corresponding to the distance 306 is not preserved and the image is compressed as the distance 306 decreases. In other examples, it may be possible to maintain the aspect ratio such that the lateral dimensions of the portion of the image 20 corresponding to the distance 306 decreases as the distance 306 decreases.

As illustrated in FIG. 10C, at least a part 25 of the image 20 between the two second portions 22 of the image 20 is condensed such that the relative separation of the second portions within the display image 10 is decreased. However, in this example the two second portions 22 are still not properly visible in the display image 10.

Figure 10D:
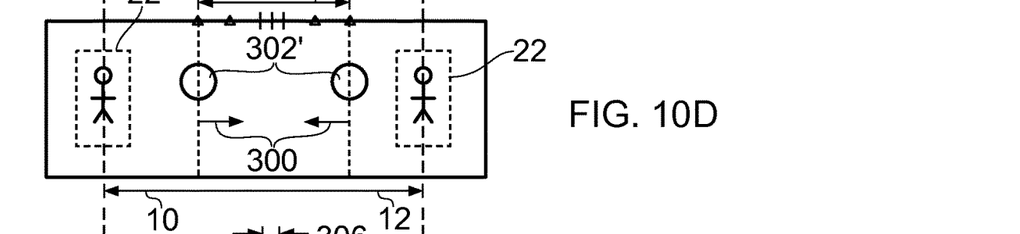
Figure 10E:
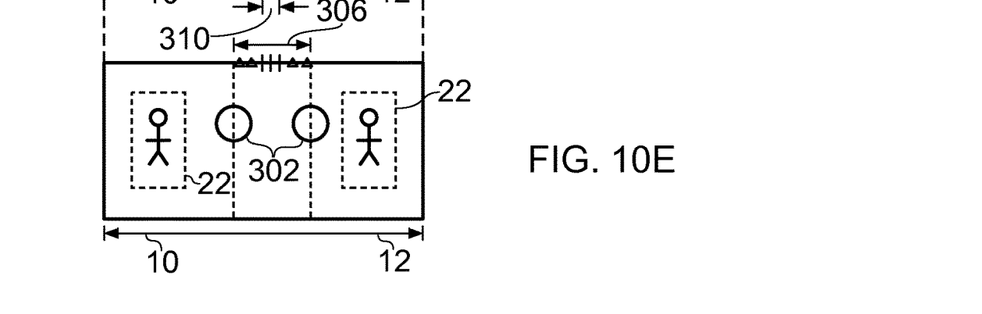

Therefore, as illustrated in FIG. 10D, a user makes a new dual touch input on the display image 10 by simultaneously making touches at image locations 302' that are separated by a distance 306' and then performing a pinch maneuver 300' that draws the touch image locations 302' towards each other as illustrated in FIGS. 10D and 10E.

It will be appreciated that as the pinch gesture is executed, the size of the display image 10 does not change whereas the separation distance 306' between the dual touch image locations 302' decreases. In this example, the content of the image 20 corresponding to the distance 306' is condensed laterally as described with reference to FIGS. 10B and 100.

As illustrated in FIG. 10E, at least parts 25' of the image 20 between the two second portions 22 of the image 20 are condensed such that the relative separation of the second portions within the display image 10 is decreased. In some examples, the part 25 of the image 20 may also be condensed in proportion, while in other examples it may not be condensed until the parts 25' have been condensed to the same extent as part 25 and then parts 25, 25'; are condensed together.

As illustrated in FIG. 10E, the two second portions 22 are displayed in the display image 10.

Figure 11A:
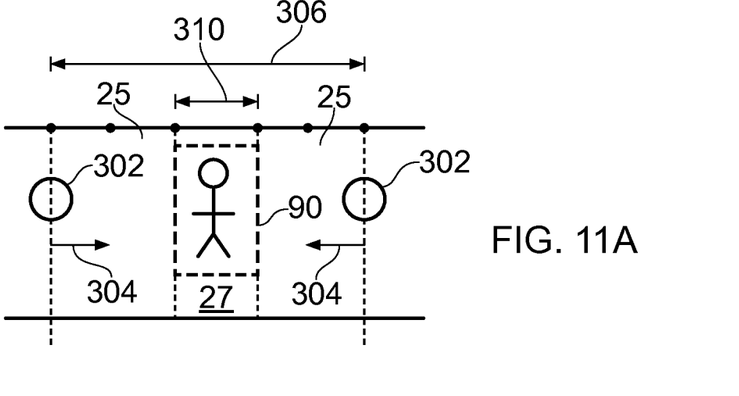
FIGS. 11A to 11B illustrate an example of image-content-dependent navigation in response to a defined user action.
Figure 11B:
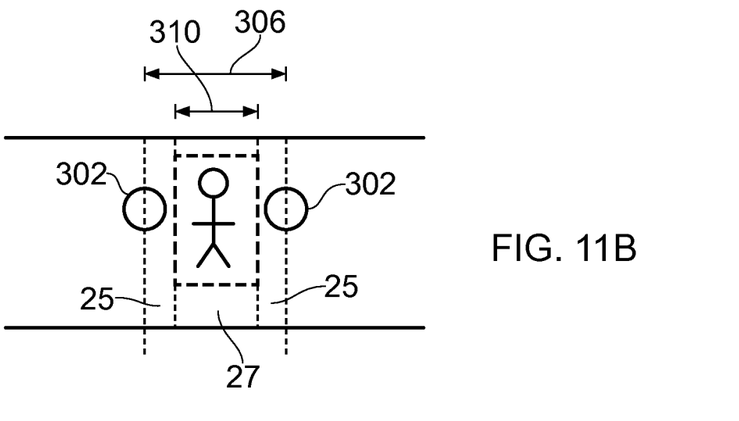

FIGS. 11A to 11B illustrate an example of non-linear image-content-dependent navigation 40 in response to a defined user action 30. In this example, the defined user action 30 is a pinch gesture 300, similar to that illustrated in FIGS. 10A-10E when an object of interest 90 lies between the touch image locations 302 defined by the pinch.

A user makes a dual touch input on the display image 10 by simultaneously making touches at image locations 302 that are separated by a distance 306 and then performing a pinch maneuver 300 that draws the touch image locations 302 towards each other. It will be appreciated that as the pinch gesture is executed, the size of the display image 10 does not change whereas the separation distance 306 between the dual touch image locations 302 decreases.

In this example, the content of the image corresponding to the distance 306 is selectively condensed laterally. The parts 25 of the image 20 between the two second portions 22 of the image 20 and excluding the part 27 comprising the object of interest 90 is condensed such that the relative separation of the second portions within the display image 10 is decreased. The part 27 comprising the object of interest 90 is protected and is not condensed laterally.

Figure 12A:
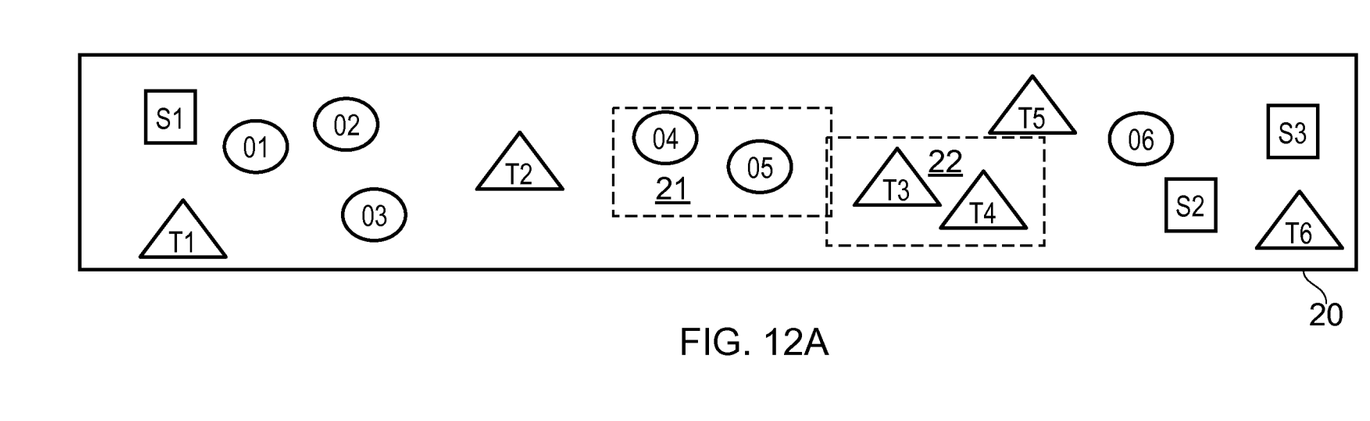
FIGS. 12A to 12C illustrate an example of image-content-dependent navigation in response to a defined user action.
Figure 12B:
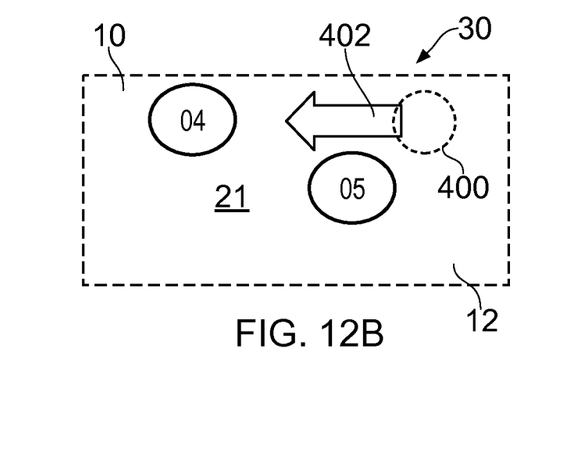
Figure 12C:
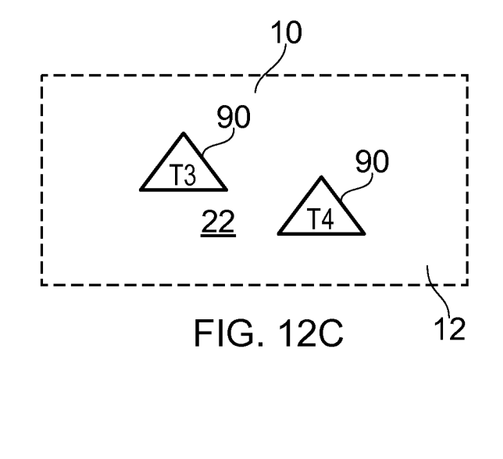

FIGS. 12A to 12C illustrate an example of non-linear image-content-dependent navigation in response to a defined user action 30. In this example, the defined user action 30 is a trace gesture 402.

FIG. 12A illustrates an image 20 comprising a plurality of objects of interest 90 identified using image processing. In the example of FIG. 12A, the display image 10 comprises the objects of interest "O4" and "O5". FIG. 12B illustrates the first portion 21 of the image 20 and FIG. 12A illustrates the location of that first portion 21 within the image 20.

FIG. 12B illustrates the performance of a defined user action 30 that cause navigation 40, as previously described. The user touches the display at a location 400 and then traces 402 their finger, while touching the display, to the left. FIG. 12C illustrates the consequence of that defined user action 30.

In FIG. 12B, a first portion 21 of the image 20 is displayed in the display image 10. In FIG. 12C, the display image 10 has been changed to include in the display image 10 a second portion 22 of the image 20. This second portion 22 of the image 20 is dependent upon the content of the image 20 and comprises an adjacent object of interest 90. The navigation 40 between the display image 10 illustrated in FIG. 12B and the display image 10 illustrated in FIG. 12C is a non-linear image-content-dependent navigation. The content of the display image 10 jumps to the next adjacent object of interest 90 without pausing on portions of the image 20 between the first portion 21 and the second portion 22.

Figure 13A:
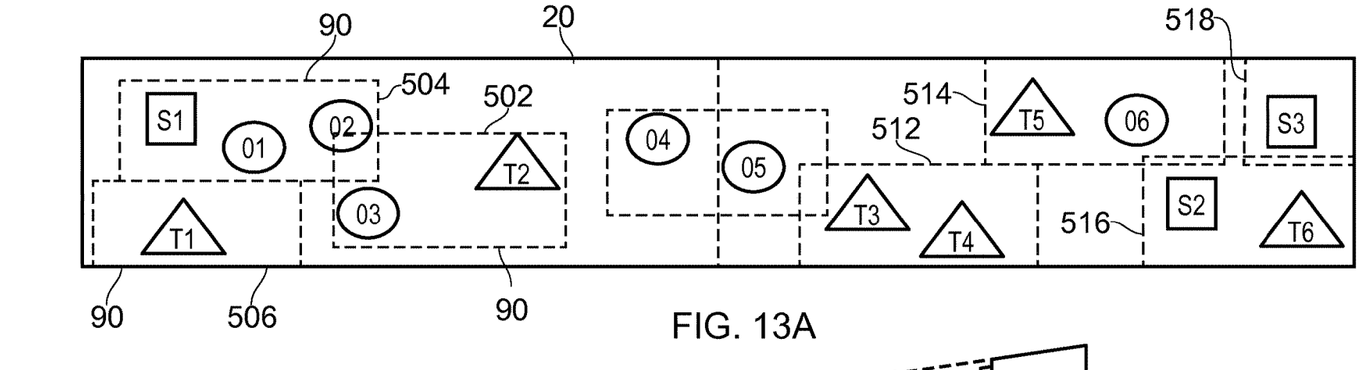
FIGS. 13A and 13B illustrate an example of enabling image-content-dependent navigation in response to a defined user action.
Figure 13B:
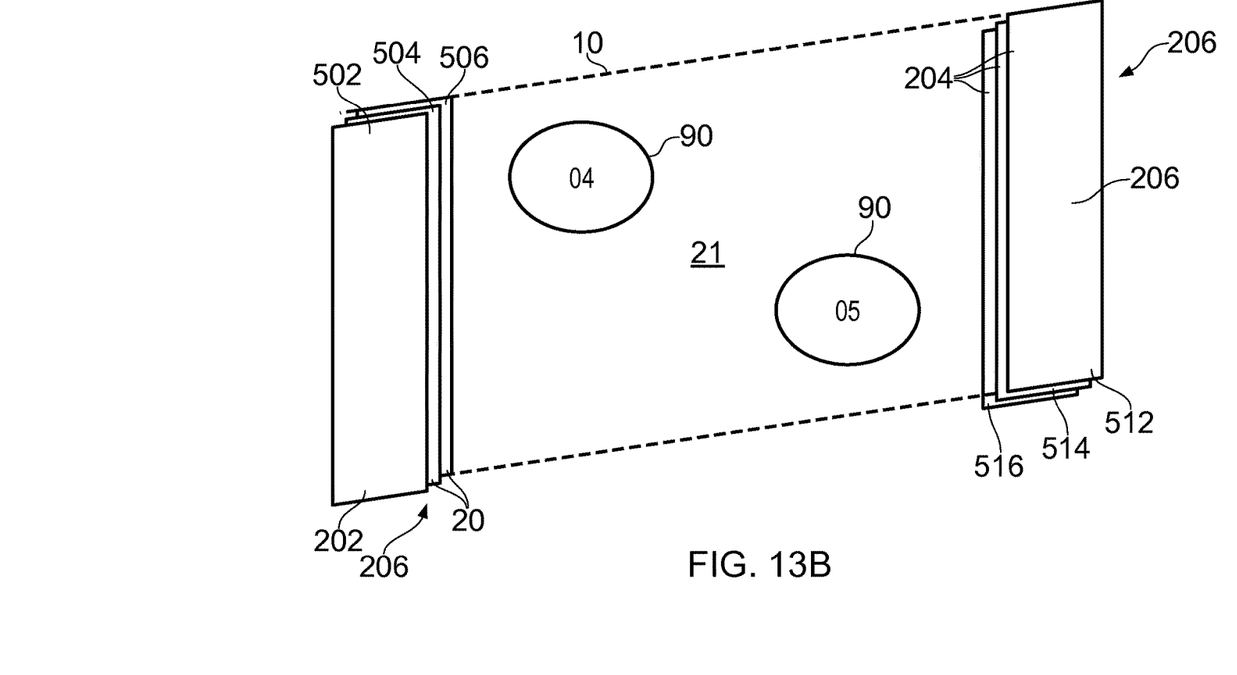

FIGS. 13A and 13B illustrate an example of non-linear image-content-dependent navigation in response to a defined user action 30. In this example, the defined user action 30 is selection of a defined user input option 206. The method has some similarity to that described with reference to FIG. 9A et seq.

FIG. 13A illustrates an image 20 comprising a plurality of objects of interest 90 that correspond to portions 502, 504, 506, . . . to the left and portions 512, 514, 516, . . . to the right. The objects of interest and their corresponding portions may be identified using image processing. In the example of FIG. 13A, the display image 10 comprises the objects of interest "O4" and "O5". FIG. 13B illustrates the first portion 21 of the image 20 and FIG. 13A illustrates the location of that first portion 21 within the image 20.

A user touches the display or otherwise provides a user input, which enables defined user input options 206. As illustrated in FIG. 13B, the user input options 206 are displayed on the display at a periphery of the display image 10. In this example a stack of first peripheral portions 204 to the left identifies multiple user selectable input options 206. Each peripheral portion 204 in the stack is associated with one of the portions 502, 504, 506 of the image 20. A stack of second peripheral portions 204 to the right identifies multiple user selectable input options 206. Each peripheral portion 204 in the stack is associated with one of the portions 512, 514, 516 of the image 20.

The selection of a user input option 206 has an effect as previously described.

If a particular peripheral portion 204 is selected as a user input option then the display image is changed to display the portion 502, 504, 506, . . . , 512, 514, 516, . . . associated with the selected peripheral portion.

The stack of peripheral portions may be displayed in a three dimensional display as overlapping portions.

Figure 14:
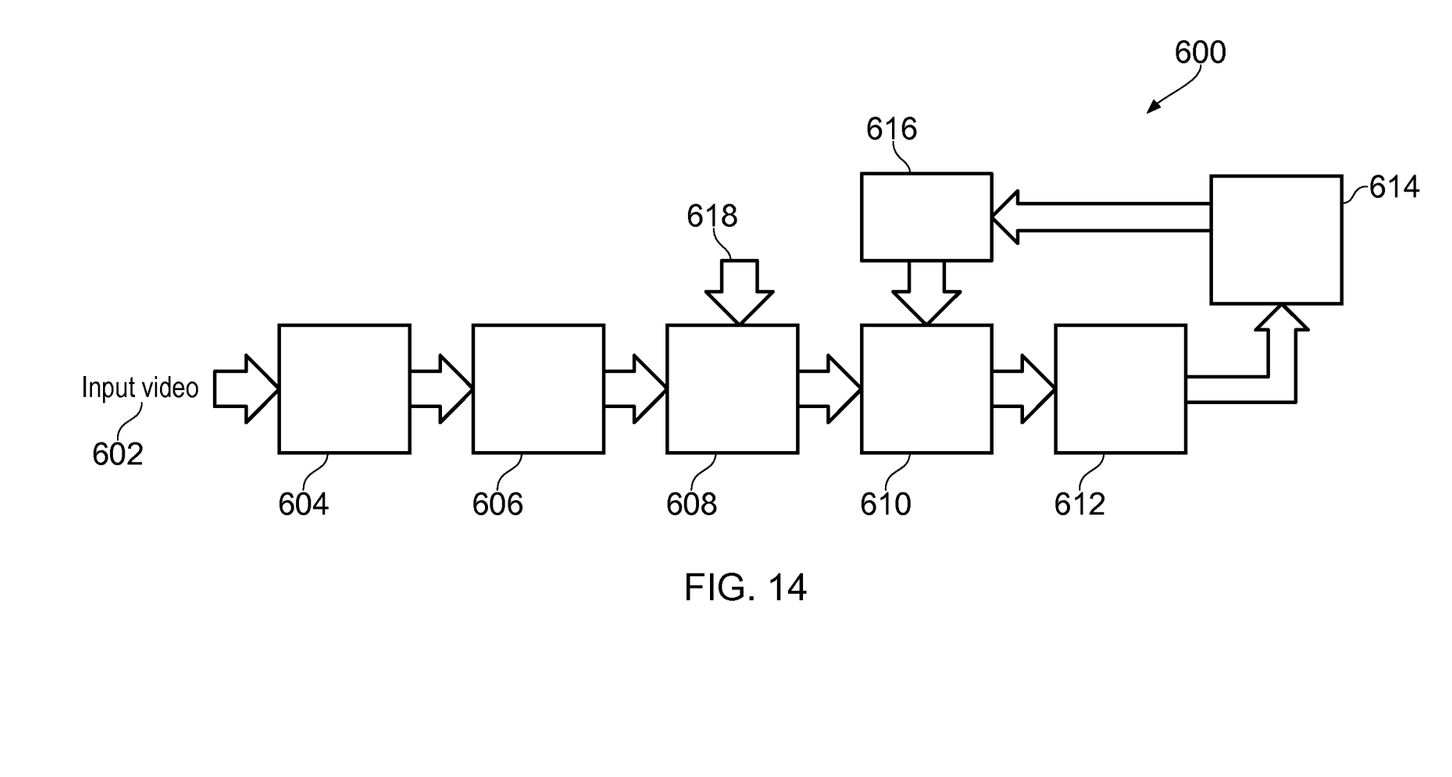
FIG. 14 illustrates an example of a method 600.

FIG. 14 illustrates an example of a method 600. The method processes input video 602 to enable the navigation 40 previously described.

At block 604, the input video 602 is analyzed. At block 606 putative objects of interest 90 are identified. At block 608 objects of interest are determined. Multiple objects of interest may be grouped to form a single object of interest 90.

Additional information 618 may be used in the process of determining objects of interest. Such information may comprise contextual information as previously described.

Next at block 610, the non-linear image-content-dependent navigation 40 is enabled based on the preceding image analysis. The image 20 is segmented into portions 21, 22 and target location 12, 12' may be determined.

Next at block 612, user selectable options may be presented on the display.

At this stage a first portion 21 of the image 20 may be displayed at a first target location 12 in a display image 10.

In response to a defined user action, performing at block 616 non-linear image-content-dependent navigation to a second portion of the image 20. This changes the display image 10 to include at a second target location 12' in the display image 10 the second portion 22 of the image 20. The second portion 22 of the image 20 is dependent upon the content of the image 20.

Figure 4:
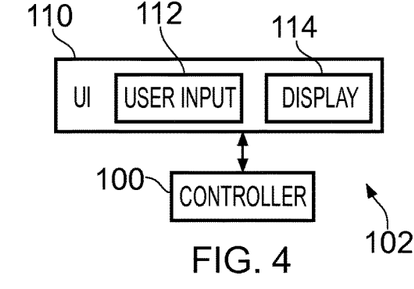
FIG. 4 illustrates an example of an apparatus comprising a controller and a user interface.

FIG. 4 illustrates an example of an apparatus 102 comprising a controller 100 and a user interface 110. The user interface 110 comprises a user input 112 and a display 114. In some, but not necessarily all examples, the user input 112 and the display may be integrated as a touch screen display. The controller 100 is configured to receive input from the user input 112 and to provide output to the display 114.

The various methods previously described may be performed under the control of a controller 100. Implementation of a controller 100 may be as controller circuitry. The controller 100 may be implemented in hardware alone, have certain aspects in software including firmware alone or can be a combination of hardware and software (including firmware).

Figures 5, 6:
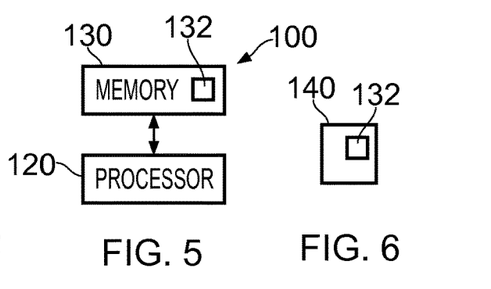
FIG. 5 illustrates an example of a controller.
FIG. 6 illustrates an example of a delivery mechanism comprising a computer program.

As illustrated in FIG. 5 the controller 100 may be implemented using instructions that enable hardware functionality, for example, by using executable computer program instructions 132 in a general-purpose or special-purpose processor 120 that may be stored on a computer readable storage medium (disk, memory etc) to be executed by such a processor 120.

The processor 120 is configured to read from and write to the memory 130. The processor 120 may also comprise an output interface via which data and/or commands are output by the processor 120 and an input interface via which data and/or commands are input to the processor 120.

The memory 130 stores a computer program 132 comprising computer program instructions (computer program code) that controls the operation of the apparatus 102 when loaded into the processor 120. The computer program instructions, of the computer program 132, provide the logic and routines that enables the apparatus to perform the methods illustrated in FIGS. 1 to 3, 8, 9 to 14. The processor 120 by reading the memory 130 is able to load and execute the computer program 132.

The apparatus 102 therefore comprises:
at least one processor 120; and
at least one memory 130 including computer program code 132
the at least one memory 130 and the computer program code 132 configured to, with the at least one processor 120, cause the apparatus 102 at least to perform:
causing display at a first target location in a display image of a first portion of an image;
and causing, in response to a defined user action, non-linear image-content-dependent navigation to a second portion of the image to change the display image to include at a second target location in the display image the second portion of the image, wherein the second portion of the image is dependent upon a content of the image.

As illustrated in FIG. 6, the computer program 132 may arrive at the apparatus 102 via any suitable delivery mechanism 140. The delivery mechanism 140 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 132. The delivery mechanism may be a signal configured to reliably transfer the computer program 132. The apparatus 102 may propagate or transmit the computer program 132 as a computer data signal.

Although the memory 130 is illustrated as a single component/circuitry it may be implemented as one or more separate components/circuitry some or all of which may be integrated/removable and/or may provide permanent/semi-permanent/dynamic/cached storage.

Although the processor 120 is illustrated as a single component/circuitry it may be implemented as one or more separate components/circuitry some or all of which may be integrated/removable. The processor 120 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the Figs may represent steps in a method and/or sections of code in the computer program 132. The illustration of a particular order to the blocks does not necessarily imply that there is a required or preferred order for the blocks and the order and arrangement of the block may be varied. Furthermore, it may be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Some images 20 have a large size compared to the window (display image 10) used to display them. For example a panorama image has an extremely wide field of view resulting in a large width to height aspect ratio. The examples described improve the manner in which a user may navigate to image content such as objects of interest within such an 'oversized' image 20.

The examples described enable a user to navigate an image 20 that at the scale at which it is viewed is significantly larger than the display size used to display the image. The navigation is non-linear and dependent upon the image content. The navigation does not occur in a linear way by for example scrolling an image pixel group by pixel group through a display image, instead, a user more quickly navigates to portions of the image that are of most interest.

In the examples, the image may be a wide field of view image. A wide field of view image has a width at least three times greater than its height. An example of a wide field of view image is a panorama image.

In the examples, an image 20 may be created by stitching together images captured from different, offset fields of view. These images may be taken by one or more cameras. If a single camera is used then images may be taken as a sequence and if multiple cameras are used images may be taken simultaneously or in a sequence.

In the examples, the image 20 may be a still image or it may be a video image. A still image is fixed and does not change in time, whereas a video image does change in time.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method, comprising:
   enabling display at a first target location in a display image of a first portion of an image; and
   in response to a defined user action, enabling non-linear image-content-dependent navigation to a second portion of the image to change the display image to include at a second target location in the display image the second portion of the image, wherein
   the second portion of the image is dependent upon a content of the image,
   the second target location is determined based at least upon image processing of the content of the image, and
   the non-linear image-content-dependent navigation is configured to allow navigation to the second portion of the image and disallow navigation to a third portion of the image, wherein the third portion of the image is a non-target location.

2. The method as claimed in claim 1, further comprising enabling image processing of the image to identify at least the second portion of the image.

3. The method as claimed in claim 2, wherein the second portion of the image is automatically identified based on the content of the image.

4. The method as claimed in claim 1, further comprising enabling a change in location of the second portion over time.

5. The method as claimed in claim 1, further comprising image processing of the content of the image to change the second target location in relation to the first target location.

6. The method as claimed in claim 1, further comprising enabling image processing of the content of the image to change a resolution of the display image based on the content of the image.

7. The method as claimed in claim 1, wherein the display image is defined with respect to a fixed location of a notional observer observing a scene captured in the image, wherein different portions of the image correspond to different orientations of the notional observer.

8. The method as claimed in claim 1, wherein the defined user action results in an outcome dependent upon the content of the image and independent of kinematics of a user action including speed and acceleration.

9. The method as claimed in claim 8, wherein the non-linear image-content-dependent navigation is dependent upon a location of the second portion of the image relative to a location of the first portion of the image.

10. The method as claimed in claim 1, wherein the non-linear image-content-dependent navigation comprises a lateral component in a direction of a lateral pan of the image and a transverse component in a direction orthogonal to a direction of the lateral pan of the image.

11. The method as claimed in claim 1, further comprising enabling image processing of the image to define target areas of the image and non-target areas of the image, wherein the non-linear image-content-dependent navigation enables navigation to locate a target area at a target location of the display image but does not enable navigation to locate a non-target area at a target location of the display image wherein navigation to obtain a display image comprising only non-target areas is forbidden.

12. The method as claimed in claim 1, further comprising enabling user selection of defined user input options provided on a display at a periphery of the display, wherein the display image is positioned centrally in the display or further comprising enabling user browsing to the second portion by using a pinch to squeeze non-target areas or further comprising enabling user browsing to the second portion by using a pinch to squeeze non-target areas while protected areas of the image are protected and are not squeezed by the pinch and/or wherein the navigation comprises browsing to a target area in response to a user swipe motion on a touch sensitive display.

13. An apparatus, comprising:
    at least one processor; and
    at least one memory including computer program code,
    the at least one memory and the computer program code being configured to, with the at least one processor, cause the apparatus at least to perform:
    enabling display at a first target location in a display image of a first portion of an image; and
    in response to a defined user action, enabling non-linear image-content-dependent navigation to a second portion of the image to change the display image to include at a second target location in the display image the second portion of the image, wherein
    the second portion of the image is dependent upon a content of the image,
    the second target location is determined based at least upon image processing of the content of the image, and
    the non-linear image-content-dependent navigation is configured to allow navigation to the second portion of the image and disallow navigation to a third portion of the image, wherein the third portion of the image is a non-target location.

14. The apparatus according to claim 13, wherein the first target location is the same as the second target location.

15. The apparatus according to claim 13, wherein the at least one memory and computer program code are further configured to, with the at least one processor, cause the apparatus to perform enabling display of only the first portion of the image in the display image or only the second portion of the image in the display image or enabling display of both the first portion and the second portion of the image in the display image.

16. The apparatus according to claim 13, wherein the at least one memory and the computer program code are configured to, with the at least one processor, enable image processing of the image to identify at least the second portion of the image.

17. The apparatus according to claim 13, wherein the second portion of the image is automatically identified based on the content of the image.

18. A computer program embodied on a non-transitory computer-readable medium, said computer program including computer-readable code which, when run on a processor, causes the processor to perform a method comprising:

enabling display at a first target location in a display image of a first portion of an image; and in response to a defined user action, enabling non-linear image-content-dependent navigation to a second portion of the image to change the display image to include at a second target location in the display image the second portion of the image, wherein the second portion of the image is dependent upon a content of the image, the second target location is determined based at least upon image processing of the content of the image, and the non-linear image-content-dependent navigation is configured to allow navigation to the second portion of the image and disallow navigation to a third portion of the image, wherein the third portion of the image is a non-target location.

\* \* \* \* \*